United States Patent
Ortner et al.

(10) Patent No.: US 10,737,576 B2
(45) Date of Patent: Aug. 11, 2020

(54) METHOD AND DEVICE FOR A HIGH-VOLTAGE ENERGY SYSTEM OF A VEHICLE

(71) Applicant: VOLKSWAGEN AKTIENGESELLSCHAFT, Wolfsburg (DE)

(72) Inventors: Andreas Ortner, Wahrenholz (DE); Sebastian Schaab, Berlin (DE); Heiner Bartoszewski, Gifhorn (DE); Erik Hahn, Isenbüttel (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 117 days.

(21) Appl. No.: 15/567,886

(22) PCT Filed: Mar. 31, 2016

(86) PCT No.: PCT/EP2016/057076
§ 371 (c)(1),
(2) Date: Oct. 19, 2017

(87) PCT Pub. No.: WO2016/169743
PCT Pub. Date: Oct. 27, 2016

(65) Prior Publication Data
US 2018/0105041 A1    Apr. 19, 2018

(30) Foreign Application Priority Data

Apr. 21, 2015 (DE) .......... 10 2015 207 222

(51) Int. Cl.
*B60L 3/00* (2019.01)
*B60L 3/04* (2006.01)
(Continued)

(52) U.S. Cl.
CPC .......... *B60L 3/0046* (2013.01); *B60L 3/0007* (2013.01); *B60L 3/0069* (2013.01); *B60L 3/04* (2013.01);
(Continued)

(58) Field of Classification Search
CPC .... B60L 3/0007; B60L 3/0046; B60L 3/0069; B60L 3/04; B60L 2240/14;
(Continued)

(56) References Cited

U.S. PATENT DOCUMENTS 8,168,315 B1    5/2012 Hermann
9,586,481 B2 *  3/2017 Deyda ............... B60R 21/01
(Continued)

FOREIGN PATENT DOCUMENTS

CN    201800559 U    4/2011
CN    104284797 A    1/2015
(Continued)

OTHER PUBLICATIONS

Symposium 2011 Proceedings, Safety of high-voltage motor vehicles, Nov. 22-23, 2011, Berlin, downloaded from http://udv.de/download/file/fid/1572 (partial GOOGLE® translation provided).
(Continued)

Primary Examiner — Jerrah Edwards
(74) Attorney, Agent, or Firm — Barnes & Thornburg LLP

(57) ABSTRACT

A method for a high-voltage energy system of a vehicle wherein a pre-accident error state is determined which shows the current existing error of the high-voltage energy system prior to the time of an accident. Then an accident event is determined. A post-accident error state is determined which shows the current existing error of the high-voltage energy system according to the time of the accident. The high-voltage energy system is deactivated in accordance
(Continued)

with the accident, the pre-accident error state, and the post-accident error state.

10 Claims, 3 Drawing Sheets

(51) Int. Cl.
*H01M 2/34* (2006.01)
*H01M 10/48* (2006.01)
(52) U.S. Cl.
CPC ........... *H01M 2/347* (2013.01); *H01M 10/48* (2013.01); *B60L 2240/14* (2013.01); *B60L 2240/80* (2013.01); *B60Y 2306/01* (2013.01)
(58) Field of Classification Search
CPC ............ B60L 2240/80; B60Y 2306/01; H01M 2/347; H01M 10/48
See application file for complete search history.

(56) References Cited

U.S. PATENT DOCUMENTS

2002/0195290 A1    12/2002    Hayakawa
2013/0307326 A1    11/2013    Fassnacht
2014/0039740 A1    2/2014    Kwon et al.
2015/0224881 A1*    8/2015    Deyda ..................... B60R 21/01
                                                                                                 701/29.2

FOREIGN PATENT DOCUMENTS

| DE | 102005036174 A1 | 2/2007 |
|---|---|---|
| DE | 102010005203 A1 | 7/2011 |
| DE | 102011010230 A1 | 8/2012 |
| DE | 102012013502 B3 | 9/2013 |
| DE | 102012015523 A1 | 2/2014 |
| DE | 102012018338 A1 | 3/2014 |
| DE | 102013015206 B3 | 7/2014 |
| DE | 102013220075 A1 | 4/2015 |
| EP | 1052149 A2 | 11/2000 |
| JP | 2006143141 A | 6/2006 |

OTHER PUBLICATIONS

Search Report for German Patent Application No. 10 2015 207 222.3, dated Oct. 25, 2015.
Search Report for International Patent Application No. PCT/EP2016/057076, dated Jul. 5, 2016.

* cited by examiner

METHOD AND DEVICE FOR A HIGH-VOLTAGE ENERGY SYSTEM OF A VEHICLE

PRIORITY CLAIM

This patent application is a U.S. National Phase of International Patent Application No. PCT/EP2016/057076, filed 31 Mar. 2016, which claims priority to German Patent Application No. 10 2015 207 222.3, filed 21 Apr. 2015, the disclosures of which are incorporated herein by reference in their entireties.

SUMMARY

Illustrative embodiments relate to methods and apparatuses for a high-voltage energy system of a vehicle. Illustrative embodiments also relate to methods and apparatuses for controlling deactivation of the high-voltage energy system of the vehicle in the event of an accident.

BRIEF DESCRIPTION OF THE DRAWINGS

The disclosed embodiments are described in detail below with reference to the drawings.

DETAILED DESCRIPTION

Figure 1:
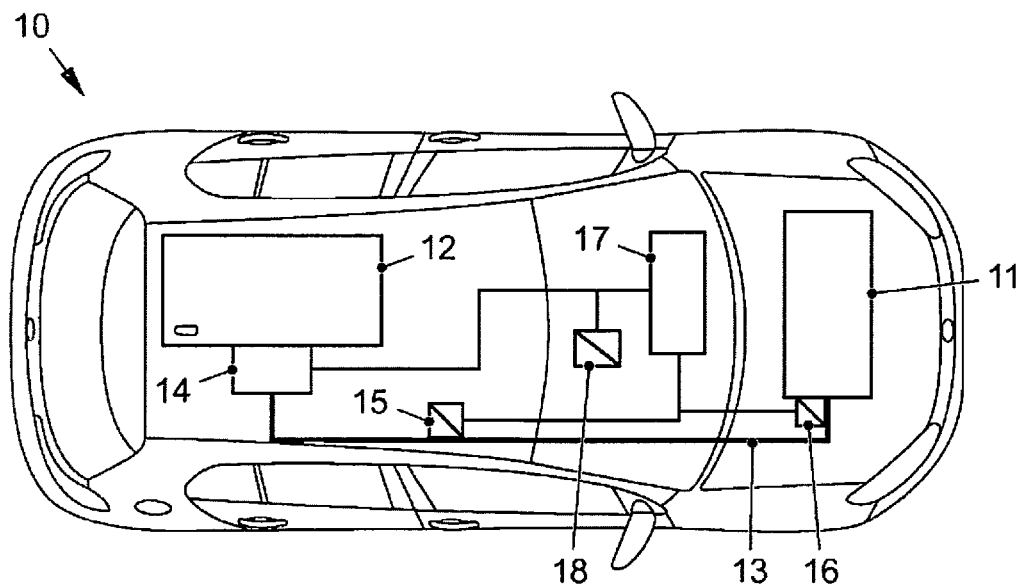
FIG. 1 schematically shows a vehicle according to a disclosed embodiment.

A high voltage energy system of a vehicle is understood to mean an energy system that operates at voltages of more than 40 volts, for example, in the region of 400 volts. These can include voltages in voltage class B, which, for DC voltages, comprises voltages between 60 volts and 500 volts and, for AC voltages, comprises voltages between 25 volts and 1000 volts. Such voltages are used in hybrid and electric vehicles, for example, to supply power to an electric motor that is used to propel the hybrid or electric vehicle. In a hybrid or electric vehicle, for example, an automobile or truck having an electric motor as drive source, a defect on the high voltage energy system, which operates at a voltage of several hundred volts, can lead to endangerment for human beings in the surrounds or in the vehicle and to consequential damage to the vehicle. By way of example, misdirected currents or defective components in the high voltage energy system can cause fires or result in dangerously high voltages being applied to components of the vehicle that can be touched by people inside or outside the vehicle. For this reason, the high voltage energy system of a vehicle is usually monitored to disconnect the high voltage energy system in the event of a fault.

In this connection, DE 10 2012 018 338 A1 discloses a method for deactivating high voltage components of a vehicle. In at least one exemplary embodiment, detection of a tremor in the vehicle prompts a distinction to be drawn between a slight accident and a serious accident. In the case of a serious accident, the high voltage components are irreversibly disconnected without further fault analysis, and in the case of a slight accident, the fault analysis is performed and the high voltage components are disconnected if the fault analysis reveals a fault in the high voltage component. The tremor or an accident or crash can be identified using an airbag sensor.

DE 10 2012 015 523 A1 relates to a high voltage battery with a discharge option following a crash. In the event of a crash, a disconnection signal is generated as a control signal. The actual crash identification can be effected using an airbag trigger system. On the basis of the control signal, an electrical connection between battery cells and the high voltage connection is either broken or restored.

DE 10 2005 036 174 A1 relates to a method for triggering battery isolations in motor vehicles. A first evaluation involves checking and deciding whether a crash has occurred. There is a crash signal if at least one crash sensor delivers a crash signal. If there is a crash signal, a further evaluation is used to check whether a present current value from a battery sensor is above a threshold value. If this prescribed threshold value is exceeded, an isolating mechanism is activated and the battery is decoupled from a line that can be broken.

As is evident from the preceding embodiments, it is necessary, for safety reasons, for the high voltage energy system of a vehicle to be diagnosed and disconnected after an accident event if a safety-relevant fault is identified. The disconnection of the high voltage energy system and if need be of a drive of the vehicle is generally performed irreversibly, i.e., the disconnection cannot be reversed by the user of the vehicle, but rather can only be reversed in a workshop after the vehicle and the high voltage energy system have been put back into a faultless state. The irreversible disconnection of the high voltage energy system means that the vehicle is no longer capable of moving on its own initiative. The vehicle is therefore broken down. A breakdown for the vehicle is extremely undesirable from the point of view of a vehicle user, since in this case the vehicle needs to be towed away and is unusable at least for a particular time.

Disclosed embodiments configure a vehicle having a high voltage energy system such that firstly an extremely high degree of safety is ensured for people in the region of the vehicle and for the vehicle itself and secondly an unnecessary breakdown for the vehicle is avoided.

This is achieved by a method for a high voltage energy system of a vehicle, a monitoring apparatus for a high voltage energy system of a vehicle, a method for a high voltage energy system of a vehicle, and a monitoring apparatus for a high voltage energy system of a vehicle.

According to the disclosed embodiments, a method for a high voltage energy system of a vehicle is provided in which a pre-accident fault state, a post-accident fault state and an accident event are determined. The pre-accident fault state indicates currently existing faults in the high voltage energy system before a time of the accident event. The post-accident fault state indicates currently existing faults in the high voltage energy system after the time of the accident event. On the basis of the accident event, the pre-accident fault state and the post-accident fault state, the high voltage energy system is deactivated. Put another way, a change in the fault state of the high voltage energy system as a result of or during the accident event is determined and this is taken as a basis for deactivating the high voltage energy system. If there were no faults in the high voltage energy system before the accident event and one or more faults exist after the accident, for example, then there are accident-conditional faults in the high voltage energy system, whereupon the high voltage energy system can be deactivated or disconnected. If, by contrast, there was already a fault in the high voltage energy system before the accident event, but the fault is so minor that disconnection of the high voltage energy system is not required, and if, further, it is established that no further serious faults have arisen on the high voltage energy system even after the accident event, then deactivation of the high voltage energy system can be avoided, since in this case no additional serious faults have arisen on the high voltage energy system as a result of the accident event. This means that it is possible to avoid a breakdown for the vehicle after a minor accident in which the high voltage energy system has not been affected.

According to at least one disclosed embodiment, the pre-accident fault state is determined by virtue of currently existing faults in the high voltage energy system being detected when the vehicle is started. Alternatively or additionally, the pre-accident fault state can be determined by virtue of currently existing faults in the high voltage energy system being cyclically detected. The pre-accident fault state is assigned the currently existing faults in the high voltage energy system that existed at a time at a prescribed minimum interval of time before the accident event. As a result, it is possible to ensure that the pre-accident fault state does not indicate any faults that have been caused by the accident event, even if the accident event has been detected after a time delay. By way of example, this makes it possible to ensure that the pre-accident fault state comprises only existing faults that existed at least one or five seconds before the accident event.

In a further disclosed embodiment, the currently existing faults comprise an insulation fault, for example, that indicates a fault in an electrical insulation of an electrical high voltage component of the high voltage energy system. The electrical high voltage component can comprise a high voltage line, a high voltage control device, a high voltage battery or a high voltage drive motor, for example. Such insulation faults can be determined using suitable sensors, for example, that perform an insulation measurement. By way of example, an insulation fault can arise on the vehicle even without an accident event, for example, if an insulation of a high voltage line is damaged by a rodent. In this case, it is generally not necessary for the high voltage energy system to be disconnected, since there is no risk of a short and the high voltage line is generally arranged in the vehicle so as to be inaccessible to a user of the vehicle. In the event of an accident, an insulation fault can arise if deformation of bodywork components of the vehicle damages the insulation of the high voltage line, for example. In this case, a short can arise between bodywork and high voltage line, as a result of which it is possible for dangerously high contact voltages to arise on the bodywork of the vehicle. If the insulation fault was thus already present before the accident, it is not necessary for the high voltage energy system to be deactivated even after the accident, whereas it is very likely to be necessary for the high voltage energy system to be deactivated if the comparison of the pre-accident fault state and the post-accident fault state reveals that the insulation fault was caused by the accident event. Alternatively or additionally, the currently existing fault can comprise a plug connection fault, which indicates a fault in a plug connection that couples an electrical high voltage component of the high voltage energy system to a further electrical high voltage component of the high voltage energy system. By way of example, the plug connection can couple a high voltage energy line to the high voltage battery or to the high voltage drive motor. By way of example, plug connection faults can be ascertained by checking a low voltage connection that, together with a high voltage connection, is coupled by the same plug connector. Even in the case of a plug connection fault, it is true that such a fault generally does not signify a danger during accident-free operation of the vehicle, for example, if a plug connector is disconnected from a battery pack, for example, by vibrations. In this case, the plug connection fault generally does not present a danger to the vehicle or to occupants. If the plug connection fault arises in connection with an accident, on the other hand, the plug connector may have been damaged or displaced by the mechanical stresses during the accident such that there is the resultant threat of a danger to the vehicle or occupants. Therefore, the high voltage energy system needs to be deactivated only if the plug connection fault has arisen in connection with the accident event. Otherwise, the vehicle can continue to be operated, which means that a breakdown can be avoided. Alternatively or additionally, the currently existing fault can comprise a line interruption fault, which indicates an interruption in a high voltage line of the high voltage energy system, for example. By way of example, line interruption faults can be ascertained using suitable sensors for monitoring a current or a voltage on the high voltage line. During accident-free operation of the vehicle, line interruption faults can have a wide variety of causes, for example, they can arise as a result of a plug that has fallen away or soiled or charred contacts in plug connectors or switching apparatuses. Deactivating the high voltage energy system in the accident-free state of the vehicle is therefore not necessary. If the line interruption fault arises as a result of an accident event, on the other hand, as can be identified by comparing the pre-accident fault state with the post-accident fault state, then the high voltage energy system needs to be deactivated to prevent a high voltage line that has been severed by the accident from producing a short or a high voltage from being applied to components that can be touched by people in the vehicle or around the vehicle. In addition, it is alternatively or additionally possible for the currently existing faults to comprise a timeout fault, which indicates that an electrical high voltage component does not react, after an actuation, within a prescribed time according to the actuation. Such timeout faults are typically identified by control apparatuses that detect reactions by the high voltage component to an actuation of the high voltage component, for example, to regulate the high voltage components. By way of example, the high voltage component can comprise the drive motor of the vehicle or an air conditioning apparatus of the vehicle. By way of example, the high voltage component can be actuated using a communication bus of the vehicle, for example, using a CAN bus. Similarly, the reaction of the high voltage component can be transmitted by the bus system. If an appropriate reaction from the high voltage component is not detected within the prescribed time, for example, a few milliseconds or one second, then there is the timeout fault. During accident-free operation, this can arise on account of a line interruption in the bus system or a disturbance in a control apparatus of the electrical high voltage component, for example. Deactivation of the high voltage energy system in the event of a timeout fault in the accident-free case is therefore generally not necessary. If the timeout fault arises in connection with an accident event, however, it is possible for the high voltage energy system to be deactivated, for example, to prevent endangerment from arising from a high voltage component damaged by the accident.

The deactivating of the high voltage energy system can comprise irreversibly disconnecting the high voltage energy system, for example. Irreversibly disconnecting the high voltage energy system means that the high voltage energy system cannot be activated again by operator control by a user of the vehicle. The high voltage energy system can therefore be activated again only by a person skilled in the art, for example, in a workshop. By way of example, the disconnecting of the high voltage energy system can comprise decoupling high voltage batteries from a high voltage energy grid of the vehicle. Alternatively or additionally, the deactivating of the high voltage energy system can comprise irreversibly disconnecting a drive motor of the vehicle that is coupled to the high voltage energy system. To this end, the drive motor is disconnected such that it cannot be activated again by operator control by a user of the vehicle, but rather can be activated only by a person skilled in the art, for example, by replacing electrical isolating apparatuses that cannot be switched on again. By isolating the battery of the vehicle from the high voltage energy system, it is possible to prevent the battery from being overloaded by a short and, as a result, overheating, exploding or burning. By disconnecting the drive motor, it is possible to prevent recuperated energy from the drive motor being introduced by the high voltage energy system in the event of a fault, and it is further possible to prevent the drive motor from being supplied with energy if it is not possible for the battery to be disconnected on account of a defect.

According to at least one disclosed embodiment, the determining of the accident event comprises detecting an acceleration of the vehicle, and comparing the detected acceleration with a prescribed acceleration threshold value. By way of example, the acceleration of the vehicle can be detected using acceleration sensors in the vehicle that are present in the vehicle anyway, for example, for airbag triggering or for an electronic stability program of the vehicle. This allows additional costs to be avoided. By comparing the detected acceleration with the prescribed acceleration threshold value, it is possible to prevent relatively small actions on the vehicle from being determined to be an accident event. This can prevent unnecessary disconnection of the high voltage energy system and therefore an unnecessary breakdown for the vehicle in the event of small accidents. Further, by comparing the detected acceleration with a further prescribed acceleration threshold value, it is possible to identify a serious accident, for which the high voltage energy system is deactivated independently of the pre-accident fault state, that is to say exclusively on account of the post-accident fault state, or the high voltage energy system is even deactivated independently of a present fault state.

As described above, the high voltage energy system is deactivated on the basis of the accident event, the pre-accident fault state and the post-accident fault state. The high voltage energy system can be deactivated only if the post-accident fault state indicates at least one fault in the high voltage energy system that goes beyond the faults of the pre-accident fault state, for example. Put another way, the high voltage energy system is deactivated only if after the accident event there is at least one fault that was not yet there before the accident event. This makes it possible to ensure that the high voltage energy system is disconnected at any rate if the accident had an influence on the high voltage energy system. A breakdown for the vehicle is prevented if the high voltage energy system has not been adversely affected by the accident.

The disclosed embodiments moreover involve a monitoring apparatus for a high voltage energy system of a vehicle being provided. The monitoring apparatus comprises an accident sensor for determining an accident event. By way of example, the accident sensor can comprise an acceleration sensor that can be used to detect accelerations in different directions, from which it is possible to infer an accident event in which the vehicle and the high voltage energy system of the vehicle has possibly been damaged. By way of example, the accident sensor can comprise an airbag sensor that controls airbag triggering in the event of an accident. The monitoring apparatus moreover comprises a fault sensor for detecting currently existing faults in the high voltage energy system. By way of example, the monitoring apparatus can comprise multiple fault sensors, for example, to detect insulation faults, plug connection faults, line interruption faults or timeout faults in the high voltage energy system. A processing apparatus of the monitoring apparatus is coupled to the accident sensor and to the fault sensor and capable of determining a pre-accident fault state and a post-accident fault state. The pre-accident fault state demonstrates currently existing faults in the high voltage energy system before the time of the accident event. Similarly, the post-accident fault state demonstrates currently existing faults in the high voltage energy system after the time of the accident event. The processing apparatus is further capable of deactivating the high voltage energy system on the basis of the accident event, the pre-accident fault state and the post-accident fault state. The monitoring apparatus is therefore suitable for performing the method described above or one of its disclosed embodiments and therefore also comprises the benefits of the method described above.

A further disclosed method for a high voltage energy system of a vehicle involves determining whether there is a first fault in the high voltage energy system and whether there is a second fault in the high voltage energy system. On the basis of the first fault and the second fault, the high voltage energy system is deactivated only if there are the first fault and the second fault at least intermittently at the same time. Put another way, the presence of just the first fault does not yet result in deactivation of the high voltage energy system, nor does the presence of just the second fault. Only if there are the first fault and the second fault at the same time is the high voltage energy system deactivated. It is naturally clear that faults other than the first fault and the second fault can lead to deactivation of the high voltage energy system independently of the method described above. This method is beneficial if the first fault and the second fault are each independently deemed not serious but can have serious consequences in combination.

By way of example, the vehicle can use what is known as a high voltage (HV) interlock to monitor the correct connection of plug connections in the high voltage circuit. To achieve this, the HV installation has what is known as a pilot line. This is a series circuit to which 12 V onboard voltage is applied and that runs from HV plug connection to HV plug connection. If the circuit of the pilot line is interrupted by removal of one of the plug connections and the resultant isolation of the pilot contacts in the plug, this is identified by an HV control unit. By way of example, the first fault may be a pilot line fault and the second fault may be an identified open HV line. The combination of both faults is an indication of a damaged or severed line that is no longer fixed in the motor compartment, for example. The result would be that the line causes consequential damage in the motor compartment. A pilot line fault does not lead to disconnection of the HV system under certain conditions, since there is no immediate endangerment. Similarly, the HV system is not disconnected in the event of an identification of open HV lines fault, since endangerment, such as, e.g., an unfixed line, is not explicitly inferred. In addition, an identified open HV line does not explicitly allow an interruption outside the component to be inferred, and it is therefore not possible to determine the appraisal of endangerment with sufficient certainty.

This method can further be combined with the accident-event-based methods described above. By way of example, the high voltage energy system is deactivated only if there are a first fault and a second fault after an accident event that were not there before an accident event. By contrast, the high voltage energy system is not deactivated if only the first fault or only the second fault arises after the accident.

According to the disclosed embodiments, a monitoring apparatus for a high voltage energy system of a vehicle is moreover provided that comprises at least one fault sensor for detecting currently existing faults in the high voltage energy system and a processing apparatus. The processing apparatus is coupled to the fault sensor and capable of determining whether there is a first fault in the high voltage energy system and whether there is a second fault in the high voltage energy system. Further, the processing apparatus is configured such that it deactivates the high voltage energy system on the basis of the first fault and the second fault only if there are the first fault and the second fault at least intermittently at the same time. The monitoring apparatus is therefore suitable for performing the method described above and therefore also comprises the benefits described above.

The disclosed embodiments further relate to a vehicle having a high voltage energy system and one of the monitoring apparatuses described above. The vehicle may be an electric vehicle or a hybrid vehicle having at least one electric motor for driving the vehicle. By way of example, the high voltage energy system relates to the electric motor, a battery, particularly a high voltage battery for storing electric power for the electric motor, high voltage lines for connecting the battery to the electric motor and control components for controlling the electric motor and the battery, for example, for charging and discharging the battery.

Although the embodiments described above have been described independently of one another, the different disclosed embodiments can be combined with one another as desired.

FIG. 1 shows a vehicle 10, for example, an electric vehicle or a hybrid vehicle having an electric motor, having a high voltage energy system. The high voltage energy system comprises an electric drive motor 11, an electrical energy store 12, for example, a rechargeable battery, an electrical high voltage grid that couples at least the electrical energy store 12 and the electric drive motor 11, and a deactivation apparatus 14 for deactivating the high voltage energy system. The deactivation apparatus 14 may be an electrical isolating apparatus, for example, that isolates the electrical energy store 12 from the high voltage grid. The high voltage grid can comprise multiple high voltage lines 13 that supply electric power from the electrical energy store 12 to high voltage energy components, such as, e.g., the drive motor 11 and an air conditioning system, not shown, of the vehicle 10. By way of example, the high voltage energy system can operate at a voltage of a few tens or a few hundreds of volts, for example, at a voltage of 400 volts. In the event of a fault in the high voltage energy system, dangerously high voltages for a human being can arise on components of the vehicle that can be touched by a vehicle user or occupants of the vehicle. Further, besides the high voltage, the energy store 12 also provides relatively high currents, which means that fault currents, for example, shorts, can result in a fire on components of the high voltage energy system. Therefore, the vehicle 10 comprises a monitoring apparatus for the high voltage energy system to detect faults in the high voltage energy system and to deactivate the high voltage energy system using the deactivation apparatus 14 if need be. The monitoring apparatus comprises fault sensors to detect currently existing faults in the high voltage energy system. By way of example, the monitoring apparatus comprises a fault sensor 15 for detecting an insulation fault in an electrical insulation of the high voltage line 13, for example, and a fault sensor 16, for example, to detect a plug connection fault on a plug connection between the high voltage line 13 and the drive motor 11. To detect a plug connection fault, there may also be provided in the plug connection, for example, besides contacts of the high voltage line 13, contacts of low voltage lines to be able to use a check on a flow of current through the low voltage contacts to establish whether the plug connection is made properly. By way of example, the fault sensor 15 can use a resistance measurement to determine an insulation fault in the high voltage line 13, for example, or on another component of the high voltage energy system. Further fault sensors may be provided, for example, to ascertain line interruption faults in a high voltage line of the high voltage energy system, or to ascertain what is known as a timeout fault, which indicates that an electrical high voltage component does not react, after an actuation, within a prescribed time according to the actuation. By way of example, a timeout fault can indicate a defect in the high voltage component if, by way of example, a communication bus, for example, what is known as a CAN communication bus, is used to send an instruction to this component and a response is not received from the component within a predetermined time. The fault sensors 15, 16 and also further fault sensors are coupled to a processing apparatus 17 of the monitoring apparatus. The processing apparatus 17 is moreover coupled to an accident sensor 18, for example, an acceleration sensor of the vehicle 10, to determine unusually strong accelerations, which can arise in the event of an accident involving the vehicle 10, for example. By way of example, the accident sensor 18 may be an acceleration sensor that is also used for airbag triggering in the vehicle 10. The processing apparatus 17 takes information from the fault sensors 15, 16 and from the accident sensor 18 as a basis for determining whether the high voltage energy system needs to be activated, and actuates the deactivation apparatus 14 accordingly. The operation of the processing apparatus 17 is described in detail below using various examples with reference to FIGS. 2-5.

Usually, an accident event, what is known as a crash event, with low accident severity is followed by the high voltage energy system of the vehicle 10 being diagnosed for faults. If a fault is identified during the diagnosis, the high voltage energy system is irreversibly disconnected and the drive, for example, the drive motor 11, is deactivated. The vehicle is therefore broken down. However, there are also faults that can arise on the high voltage energy system independently of an accident. To avoid an unnecessary breakdown for the vehicle, faults that arise independently of an accident involving the vehicle do not imperatively result in irreversible disconnection of the high voltage energy system. If, by way of example, an insulation fault arises on the high voltage line 13 during normal accident-free operation of the vehicle, then the high voltage energy system is generally not deactivated. The reason for the insulation fault arising may be damage to the high voltage line 13 by martens, for example, or the penetration of moisture into a plug connection on the high voltage line 13. Although these faults need to be rectified as soon as possible, they should not result in a breakdown for the vehicle 10, since there is no immediate danger to an occupant of the vehicle or to the vehicle itself. If, by contrast, such an insulation fault is diagnosed after an accident, this insulation fault may have arisen as a result of deformation of bodywork parts, for example, as a result of which the insulation of the high voltage line 13 has been damaged. In this case, there is the danger that a dangerously high voltage is applied to the bodywork, which means that irreversible disconnection of the high voltage energy system may be necessary for personal protection. If the insulation fault already existed before the accident, however, disconnection of the high voltage energy system on account of the insulation fault after the accident results in an unnecessary breakdown for the vehicle, which may be inconvenient for the vehicle user particularly when damage to the vehicle is slight, since he is then unable to continue to drive, even though his vehicle would in principle still be operational, and additional costs can arise for activating the irreversible disconnection.

Figure 2:
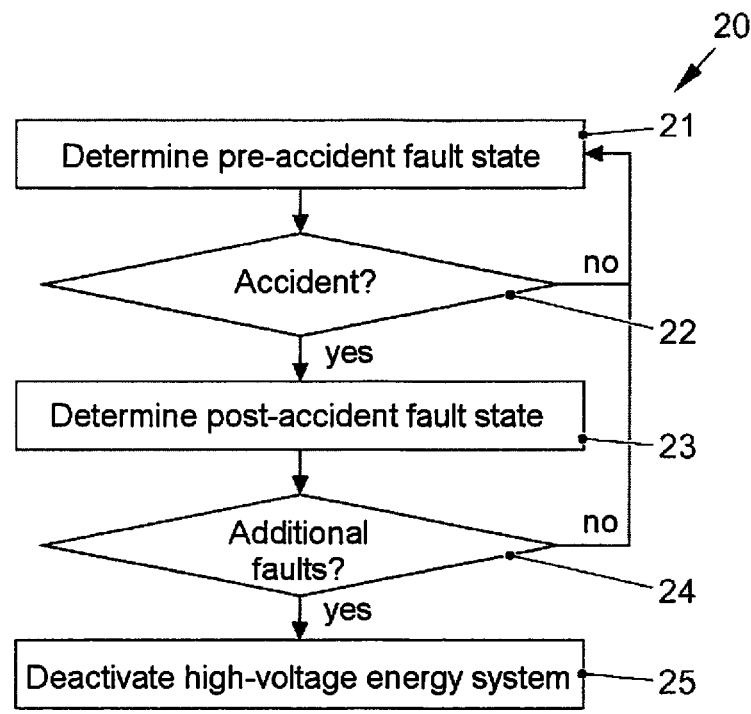
FIG. 2 shows method operations of a method according to a disclosed embodiment.

To avoid this unnecessary deactivation of the high voltage energy system, the processing apparatus 17 carries out method operations at 21-25 of the method 20 in FIG. 2. In operation at 21, a fault state of the high voltage energy system before an accident event is determined. This fault state is subsequently referred to as the pre-accident fault state. The pre-accident fault state can be detected and stored continually or at fixed intervals of time, for example, when the ignition of the vehicle is switched on. If an accident event is then ascertained in operation at 22, for example, by evaluating signals from the accident sensor 18, the pre-accident fault state is not altered further, but rather retained ("frozen"), so that a fault picture of the high voltage energy system from before the accident is also available after the accident. In operation at 23, the present fault state of the high voltage energy system is determined after the accident event. This fault state is subsequently referred to as the post-accident fault state. By comparing the pre-accident fault state with the post-accident fault state, it is possible to establish in operation at 24 whether additional faults have arisen in the high voltage energy system as a result of the accident. If no additional faults have arisen, the high voltage energy system is not deactivated and the method can be continued in operation at 21. If additional faults are ascertained in operation at 24, the high voltage energy system is deactivated in operation at 25, for example, by virtue of the deactivation apparatus 14 isolating the high voltage line 13 from the energy store 12 and the drive motor 11 being deactivated. By deactivating the drive motor 11, it is possible to prevent recuperated energy from being supplied to the high voltage energy system by the vehicle 10, which is still moving, for example.

Figure 3:
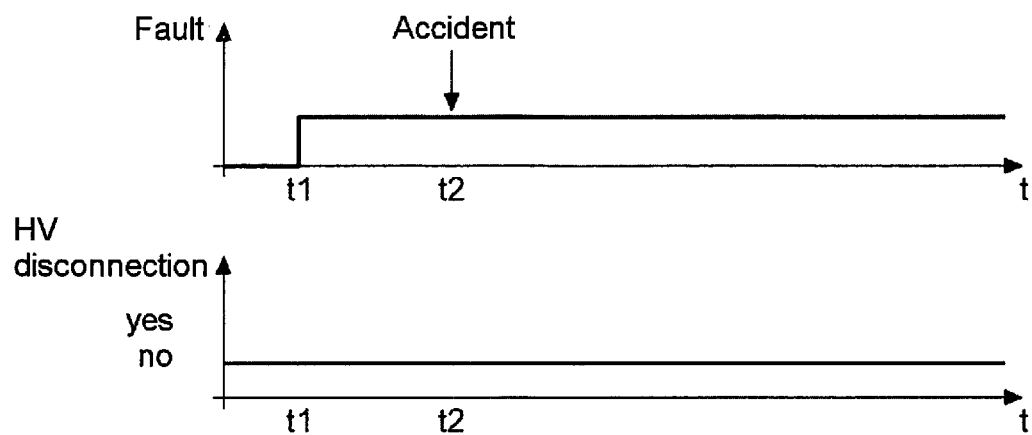
FIGS. 3 and 4 show time sequences for a high-voltage disconnection according to a disclosed embodiment.
Figure 4:
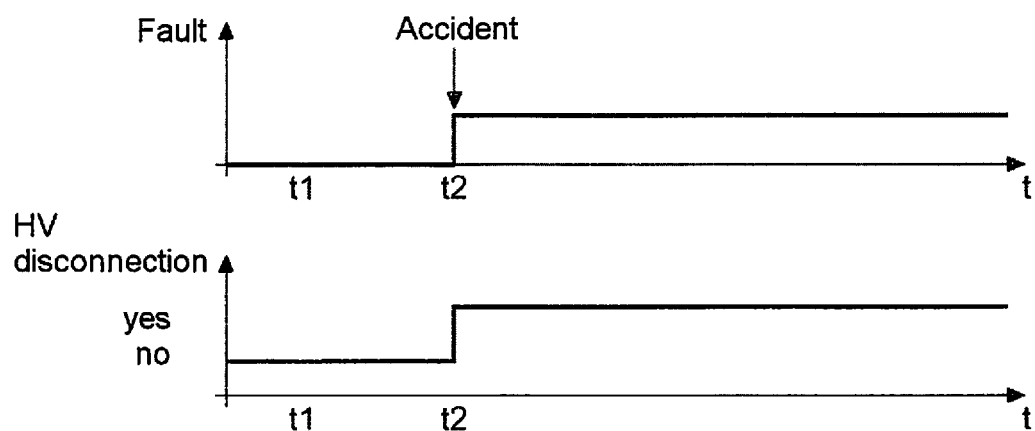

FIGS. 3 and 4 illustrate the method described above as a timing diagram. In FIG. 3, a fault in the high voltage energy system arises independently of an accident, before the accident. In FIG. 3, a fault arises in the high voltage energy system at time t1. Since this fault is deemed to be minor or not serious during normal operation of the vehicle, the high voltage energy system (HV) is not disconnected at time t1. At time t2, an accident event arises. Since the fault already existed before the accident, the high voltage energy system is not disconnected at time t2, but rather remains continually activated.

In FIG. 4, a fault in the high voltage energy system arises at the same time as an accident, that is to say presumably conditionally on the accident. In the period from t1 to t2, there are no faults. Therefore, the high voltage energy system is also not disconnected in this period. At time t2, an accident event arises and at the same time a fault. Accordingly, the high voltage energy system is disconnected at time t2 and thereafter remains continually, that is to say irreversibly, disconnected. The fault in the example of FIG. 3 may be the same as the fault in the example of FIG. 4. Since this fault in FIG. 4 arises at the same time as the accident event, it is deemed to be more serious, however, and therefore the high voltage energy system is disconnected.

In summary, it is assumed that if a fault arises in the high voltage energy system only after an accident event, then this fault has been caused by the accident. Attributing a damaged high voltage energy system to an accident is meaningful only in the event of simultaneous impairment of the functional status of the high voltage energy system. If, after an accident, a fault is detected that was already there before the accident, it is not possible to assume that this fault has been caused by the accident. Therefore, such faults can be ignored. In addition to the status of the fault, the alteration of the fault is therefore also evaluated. To this end, it is necessary to store the status of relevant fault entries at a suitable time, for example, when the vehicle is started, before the accident. This stored fault status is compared with the present fault status after the accident.

Generally, it is possible to include multiple types of fault, for example, insulation faults, plug connection faults, high voltage interlock faults, line interruption faults and timeout faults. Grouping of the fault types means that the fault reaction can differ from the evaluation described above. If two faults arrive at the same time, for example, and there is therefore endangerment of people or endangerment of components, the high voltage energy system can fundamentally, that is to say independently of the alteration of the fault, or additionally be disconnected on the basis of the alteration of the fault.

Figure 5:
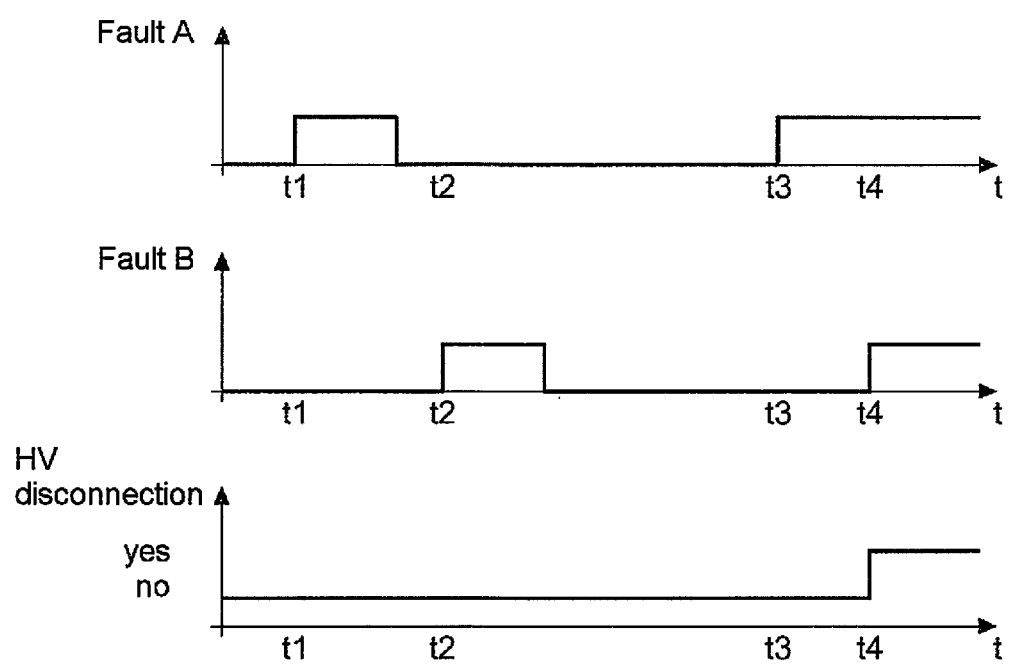
FIG. 5 shows time sequences for a high voltage disconnection according to a further disclosed embodiment.

FIG. 5 shows, by way of example, that two faults (fault A and fault B), if they each arise individually, do not result in the high voltage energy system being disconnected, but do result in the high voltage energy system being disconnected if they are there at the same time at least at one time. In detail, in the example of FIG. 5, fault A is there for a short time from time t1 and no longer exists if fault B is there at time t2. Fault B exists no longer a short time later. The high voltage energy system is not disconnected, since each of faults A and B on its own is not critical. At time t3, fault A arises again and lasts beyond time t4, at which fault B additionally arises. Since fault A and fault B are there at the same time from time t4, this state is deemed critical and the high voltage energy system is disconnected at time t4. Fault A may be an insulation fault, for example, and fault B may be a communication fault in regard to a monitoring apparatus of a high voltage component. If the faults arise separately from one another, the endangerment for people and the vehicle is deemed slight in each case. If both faults arise at the same time, however, the insulation fault can mean that a short arises, for example, which would be identified by the monitoring apparatus in principle. Since the communication in regard to the monitoring apparatus is likewise faulty, however, there is now the danger that a short on account of the insulation fault is not identified and, as a result, a vehicle fire can develop or a dangerously high voltage is applied to a component of the vehicle that can be touched by a vehicle user. Therefore, disconnection of the high voltage energy system is necessary in this double-fault case.

LIST OF REFERENCE SYMBOLS

10 Vehicle
11 Drive motor

12 Energy store
13 High voltage line
14 Deactivation apparatus
15 Fault sensor
16 Fault sensor
17 Processing apparatus
18 Accident sensor
20 Method
21-25 Operations

The invention claimed is:

1. A method for a high voltage energy system of a vehicle, the method comprising:
    determining an accident event;
    determining a post-accident fault state that indicates faults present in the high voltage energy system after a time of the accident event;
    determining a pre-accident fault state that indicates faults present in the high voltage energy system before the time of the accident event; and
    deactivating the high voltage energy system based on the accident event, the pre-accident fault state and the post-accident fault state.

2. The method of claim 1, wherein the determining of the pre-accident fault state comprises:
    detecting faults present in the high voltage energy system when the vehicle is started; and/or
    cyclically detecting faults present in the high voltage energy system, wherein the pre-accident fault state is assigned the faults present in the high voltage energy system that existed at a time at a prescribed minimum interval of time before the accident event.

3. The method of claim 1, wherein a fault from the faults present comprises at least one fault from the group comprising:
    an insulation fault, which indicates a fault in an electrical insulation of an electrical high voltage component of the high voltage energy system;
    a plug connection fault, which indicates a fault in a plug connection that couples an electrical high voltage component of the high voltage energy system to a further electrical high voltage component of the high voltage energy system;
    a line interruption fault, which indicates an interruption in a high voltage line of the high voltage energy system; and
    a timeout fault, which indicates that an electrical high voltage component does not react, after an actuation, within a prescribed time according to the actuation.

4. The method of claim 1, wherein the deactivating of the high voltage energy system comprises:
    irreversibly disconnecting the high voltage energy system such that so the high voltage energy system cannot be activated by means of operator control by a user of the vehicle; and/or
    irreversibly disconnecting a drive motor of the vehicle coupled to the high voltage energy system, such that so the drive motor cannot be activated by means of operator control by a user of the vehicle.

5. The method of claim 1, wherein the determining of the accident event comprises:
    detecting an acceleration of the vehicle; and
    comparing the detected acceleration with a prescribed acceleration threshold value.

6. The method of claim 1, wherein the high voltage energy system is deactivated only if the post-accident fault state indicates at least one fault in the high voltage energy system that goes beyond the faults of the pre-accident fault state.

7. A monitoring apparatus for a high voltage energy system of a vehicle, the monitoring apparatus comprising:
    an accident sensor for determining an accident event;
    at least one fault sensor for detecting existing faults in the high voltage energy system; and
    a processing apparatus that is coupled to the accident sensor and to the fault sensor and configured to determine a post-accident fault state that indicates existing faults in the high voltage energy system after a time of the accident event,
    wherein the processing apparatus is further configured to determine a pre-accident fault state that indicates existing faults in the high voltage energy system before the time of the accident event and to deactivate the high voltage energy system based on the accident event, the pre-accident fault state and the post-accident fault state.

8. The monitoring apparatus of claim 7, wherein the monitoring apparatus performs a method comprising:
    determining an accident event;
    determining a post-accident fault state that indicates existing faults in the high voltage energy system after a time of the accident event;
    determining a pre-accident fault state that indicates existing faults in the high voltage energy system before the time of the accident event; and
    deactivating the high voltage energy system based on the accident event, the pre-accident fault state and the post-accident fault state.

9. A method for a high voltage energy system of a vehicle, the method comprising:
    determining whether there is a first fault in the high voltage energy system;
    determining whether there is a second fault in the high voltage energy system; and,
    deactivating the high voltage energy system based on the first fault and the second deactivating fault only in response to the first fault and the second fault at least momentarily overlapping.

10. A monitoring apparatus for a high voltage energy system of a vehicle, the monitoring apparatus comprising:
    at least one fault sensor for detecting existing faults in the high voltage energy system; and
    a processing apparatus coupled to the fault sensor and configured to determine whether there is a first fault in the high voltage energy system and whether there is a second fault in the high voltage energy system,
    wherein the processing apparatus is further configured to deactivate the high voltage energy system based on the first fault and the second fault only in response to the first fault and the second fault at least momentarily overlapping.

* * * * *